March 30, 1937.　　　P. SCHWARY ET AL　　　2,075,473
SPACER FOR STACKING CUT MEATS
Filed July 29, 1936
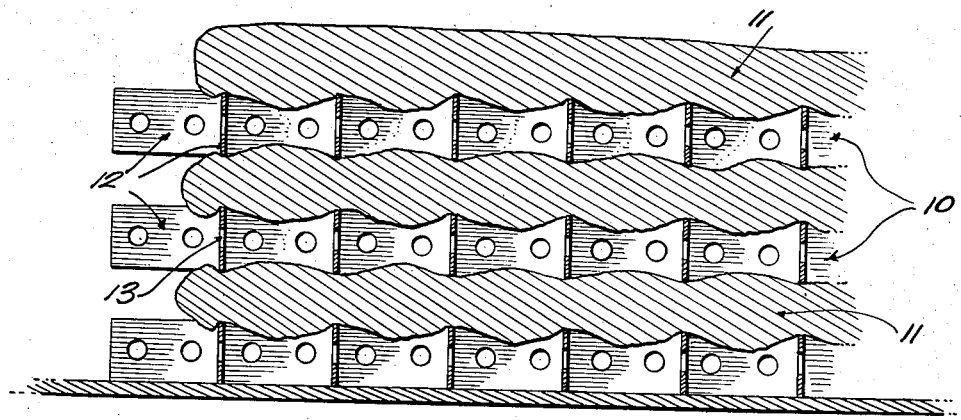
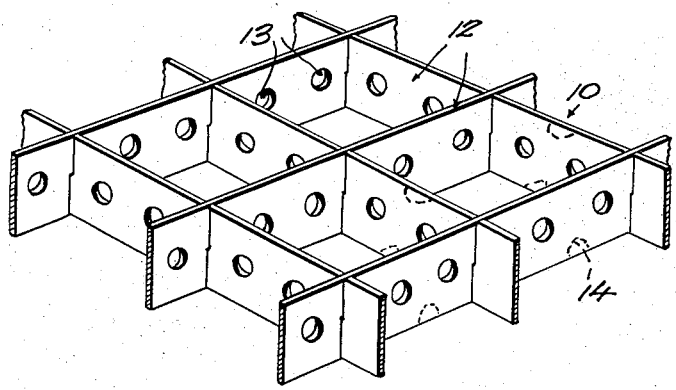
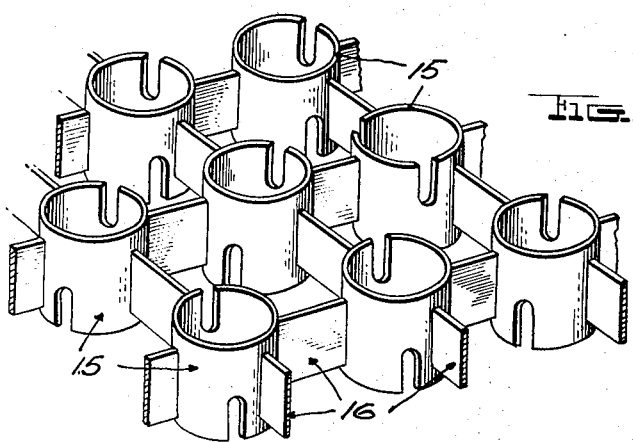
Inventors
Philip Schwary
John G. Watson
By
Myron G. Olean
Attorney Patented Mar. 30, 1937

2,075,473

UNITED STATES PATENT OFFICE 2,075,473

SPACER FOR STACKING CUT MEATS

Philip Schwary and John G. Watson, Portland, Oreg., assignors, by direct and mesne assignments, of one-fifth to Mitchell Schwary, one twenty-fifth to William F. Watson, one-fifth to Louise Gilkey, and four twenty-fifths to Mamie E. Watson, all of Portland, Oregon Application July 29, 1936, Serial No. 93,271

4 Claims. (Cl. 99—234)

Our present invention relates generally to devices of the character described and claimed in our copending application filed February 28, 1936, under Serial Number 66,280, for the purpose of spacing meat cuts in stacks with the object of permitting the circulation of air on all surfaces of the meat cuts to prevent loss of juices, discoloration of the meat, and to insure that the meat will stay fresh and sweet in the stack.

In our above application we disclosed for the above purpose a certain construction of spacer which included a flat, horizontal body plate with meat engaging elements projecting beyond both surfaces thereof, and it is the primary object of our present invention to improve this structure by an arrangement which, while preserving all of the advantages of the former structure in use, will obviate the necessity of a body plate and enable us to more readily and economically manufacture the spacer.

In the accompanying drawing, which illustrates our present structure and arrangement of parts and which forms a part of this specification, Figure 1 is a vertical sectional view showing the practical application of the invention.

Figure 2 is a detail perspective view showing one form of construction, and

Figure 3 is a fragmentary perspective view showing a slightly modified form.

Referring now to these figures, and as particularly seen in Figure 1, the spacers, generally indicated at 10, are used between the several slices or cuts 11 of meat in a vertical stack such as commonly found in stores where meats are sold. The spacers and meat cuts alternate in the stack and, by means of the former, the meat cuts 11 are vertically spaced from one another in out-of-contact relation, with provision for free circulation of air throughout the surfaces of the meat so as to avoid loss of juices and discoloration of the meat and maintain the same so that they will remain in attractive, pleasing appearance as well as fresh and sweet over a considerable period of time.

To do this it is essential that the spacers contact the meat cuts over very small proportions of the surfaces of the latter, and hence according to Figure 2 we propose a spacer consisting of a plurality of rightangularly crossing strips 12 of a material sufficiently rigid to maintain itself, in this crossing interconnected relation, in vertically edgewise relation. This material may be cellophane or other cellulose material, since when so formed the spacers will not only be transparent but may be readily and easily maintained in clean, sanitary condition.

The strips 12 may be vertically slitted partially through the same where they cross one another, and to lend rigidity and strength to the spacer as a whole these interengaging slitted portions may be readily secured by an adhesive which may be a solvent of the material, for instance, a cellulose acetate.

Thus the spacer is formed to present a series of upper and lower supporting edges for contact with the meat, by means of a plurality of interconnected members, all of which are disposed vertically in the spacer whereby the latter may be readily formed either by joining strips as previously described or by a molding operation as a unit, and also whereby the free circulation of air may be effectively permitted through openings 13 in the strips, or by notches or slots 14 in their upper and lower edges, or both.

According to Figure 3, the spacer may be formed by a series of vertically disposed tubular elements 15 connected by vertical webs 16, and either having openings or edge recesses or slots for the circulation of air. The elements 15 may be either cylindrical or polygonal and the connecting webs 16 may be either of the same or a lesser height than elements 15.

According to either of the described forms, a generally rectangular spacer is made up of a plurality of connected elements which, with their connections, are disposed in edgewise relation vertically of the spacer to present upper and lower relatively thin meat contacting edges, the several elements having apertures opening horizontally between the same throughout the series for free circulation of air.

What is claimed is:

1. A generally rectangular spacer for stacked meats consisting wholly of a plurality of interconnected elements, said elements and their connections being disposed in vertically edgewise relation therein and presenting upper and lower relatively thin meat supporting edges and having apertures providing a circulation of air horizontally throughout the spacer.

2. A spacer for stacked meats consisting of a plurality of thin strips disposed in vertically edgewise relation and supported solely by reason of their connection with one another to form upper and lower relatively thin meat contacting edges, said strips having apertures providing for circulation of air horizontally throughout the series.

3. A spacer for stacked meats consisting of a horizontal series of webs arranged at right angles to one another and in vertically edgewise relation whereby the upper and lower edges form meat supporting and contacting surfaces, said webs being apertured and providing for circulation of air horizontally throughout the series between said surfaces.

4. A spacer for stacked meats consisting of a plurality of webs connected to one another in vertically edgewise relation and at right angles and supported wholly by virtue of their connections, said webs having apertures providing for circulation of air horizontally throughout the series.

PHILIP SCHWARY.
JOHN G. WATSON.